(12) United States Patent
Tsuchiya (10) Patent No.: US 7,819,215 B2
(45) Date of Patent: Oct. 26, 2010

(54) BATTERY PACK LOADING STRUCTURE

(75) Inventor: Takenori Tsuchiya, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 468 days.

(21) Appl. No.: 11/794,902

(22) PCT Filed: Mar. 9, 2006

(86) PCT No.: PCT/JP2006/305197

§ 371 (c)(1), (2), (4) Date: Jul. 9, 2007

(87) PCT Pub. No.: WO2006/109402

PCT Pub. Date: Oct. 19, 2006

(65) Prior Publication Data

US 2008/0047767 A1 Feb. 28, 2008

(30) Foreign Application Priority Data

Mar. 30, 2005 (JP) .............................. 2005-097296

(51) Int. Cl.
*B60R 16/04* (2006.01)
(52) U.S. Cl. .................................................. 180/68.5
(58) Field of Classification Search ............... 180/65.1, 180/65.21, 68.1, 68.5; 165/61; 126/569; 219/209; 320/137; 429/96
See application file for complete search history.

(56) References Cited

U.S. PATENT DOCUMENTS

| | | | | |
|---|---|---|---|---|
| 5,639,571 | A * | 6/1997 | Waters et al. .................. 429/71 |
| 5,736,272 | A * | 4/1998 | Veenstra et al. ............... 429/99 |
| 5,882,213 | A * | 3/1999 | Witek et al. ................. 439/76.2 |
| 5,994,789 | A * | 11/1999 | Ochiai ........................ 307/10.1 |
| 6,632,560 | B1 * | 10/2003 | Zhou et al. ..................... 429/99 |
| 6,811,197 | B1 * | 11/2004 | Grabowski et al. ......... 296/37.8 |
| 6,819,085 | B2 | 11/2004 | Kimoto |
| 6,935,449 | B2 * | 8/2005 | Chernoff et al. ........... 180/65.1 |
| 7,048,321 | B2 * | 5/2006 | Bandoh et al. ............. 296/37.8 |
| 7,353,900 | B2 * | 4/2008 | Abe et al. .................. 180/68.5 |
| 7,419,209 | B1 * | 9/2008 | Mangiapane et al. ........ 296/208 |
| 7,427,093 | B2 * | 9/2008 | Watanabe et al. ......... 296/37.15 |
| 2001/0030069 | A1 * | 10/2001 | Misu et al. .................. 180/68.1 |
| 2004/0232672 | A1 | 11/2004 | Bandoh et al. |
| 2005/0285563 | A1 * | 12/2005 | Yoneda ........................ 320/112 |

(Continued)

FOREIGN PATENT DOCUMENTS

JP A 2001-105893 4/2001

(Continued)

*Primary Examiner*—Paul N Dickson
*Assistant Examiner*—Brodie Follman
(74) *Attorney, Agent, or Firm*—Oliff & Berridge, PLC (57) ABSTRACT

In the battery pack loading structure, one end of a harness is led out from a rear end of a junction box to descend along a rear side of a second battery pack. Further, the harness is routed across a space formed between a rear side bottom of the second battery pack and the floor. Then, the harness traverses a space defined by a seat leg and the floor. Eventually, the other end of the harness is connected to a DCDC converter. This structure allows for favorable workability in assembling the battery pack and peripheral equipment even in the case where the battery pack is arranged in the center console box.

2 Claims, 6 Drawing Sheets

U.S. PATENT DOCUMENTS

| | | | |
|---|---|---|---|
| 2006/0096797 A1 | 5/2006 | Tsuchiya | |
| 2006/0237248 A1* | 10/2006 | Hayashi | 180/68.5 |
| 2008/0164081 A1* | 7/2008 | Watanabe et al. | 180/65.2 |
| 2008/0257624 A1* | 10/2008 | Kubo | 180/68.1 |
| 2009/0183935 A1* | 7/2009 | Tsuchiya | 180/68.1 |

FOREIGN PATENT DOCUMENTS

| | | |
|---|---|---|
| JP | A 2002-219949 | 8/2002 |
| JP | A 2004-237803 | 8/2004 |
| JP | A 2004-255892 | 9/2004 |
| JP | A 2004-268779 | 9/2004 |
| JP | A 2004-291715 | 10/2004 |
| JP | A 2004-296217 | 10/2004 |
| JP | A 2004-345447 | 12/2004 |
| JP | A 2005-1655 | 1/2005 |
| JP | A 2005-306239 | 11/2005 |

* cited by examiner

BATTERY PACK LOADING STRUCTURE

TECHNICAL FIELD

The present invention relates to a battery pack loading structure in an electric vehicle and the like.

BACKGROUND ART

In recent years, electric vehicles that employ an electric motor as the driving source and also the so-called hybrid vehicles based on the combination of an electric motor as the driving source and another driving source (for example, an internal combustion engine, fuel cell, or the like) are adapted to practical use. In such vehicles, a battery to supply electricity qualified as the energy to the electric motor is loaded. For this battery, a secondary battery represented by a nickel-cadmium battery, a nickel-hydrogen battery, a lithium ion battery, or the like that can be charged and discharged repeatedly is used.

A secondary battery is constituted of a battery module in which battery cells are stacked. This battery module is loaded in a vehicle in a stored state in a battery case. This battery case and the battery module together with other internal components stored in the battery case are referred to as a battery pack. Cooling apparatuses such as a fan, duct, and the like are attached to the battery pack in order to introduce cooling airflow into the interior for controlling the temperature of the battery module stored inside.

During the past several years, there is a demand for a secondary battery of larger capacitance. To meet this demand, a possible arrangement of the battery pack is inside the center console box located between the driver seat and the front passenger seat for a large-sized car, as an example of the site where the secondary battery is to be loaded. In a hybrid electric vehicle and the like, the motor qualified as the driving source is incorporated in the engine room located at the front of the vehicle. Electric power must be supplied to this motor from the battery pack by means of the power cable. A long route of the power cable must be avoided in view of the passage of high voltage and high-amperage current. Arrangement at the center console box is advantageous from the standpoint of rendering the power cable length short due to the location close to the engine room. Furthermore, by placing the battery pack between the driver seat and the front passenger seat, a larger room for the passenger compartment can be provided effectively. Thus, the arrangement of the battery pack in the center console box between the driver seat and the front passenger seat can be thought of as an appropriate location, as mentioned above.

In view of the limited space in the center console box located between the driver seat and the front passenger seat, the battery pack, the cooling apparatuses, and other peripheral equipment must be disposed between and in the proximity of the driver seat and the front passenger seat without degrading the environment of interior comfort in the vehicle. Further, the effect of outside temperature on the battery pack must be considered. In addition, the workability in assembling the battery pack, cooling apparatus, and other peripheral equipment into the center console box must be taken into account.

Japanese Patent Laying-Open No. 2004-237803 discloses a structure in which the battery pack is arranged below the seat, and the airflow subsequent to cooling the battery pack is forced in the vehicle widthwise direction. However, there is a problem when a battery of large capacitance is to be loaded in the vehicle. A large battery pack cannot be placed under the seat since the space is insufficient. Further, the large amount of air to cool the battery pack may cause discomfort to the passenger if the cooling air subsequent to the cooling operation is simply output from one place (in the vehicle), leading to degradation in the in-car environment.

Figure 5:
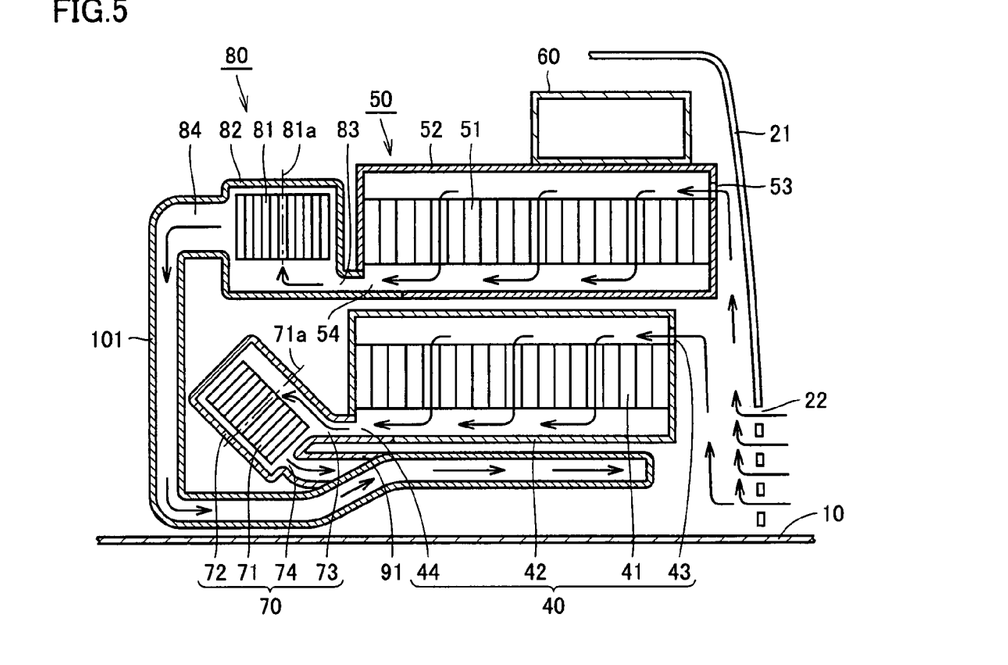
FIG. 5 is a vertical sectional view of inside the center console box taken along the longitudinal direction of the vehicle, according to an embodiment of the present invention.

Japanese Patent Laying-Open No. 2001-105893 discloses a structure of loading the battery pack between the driver seat and the front passenger seat (FIG. 5). However, this publication is silent about the specific structure of disposing the cooling apparatus to cool the battery pack and other peripheral equipment.

Japanese Patent Laying-Open No. 2004-296217 discloses (in Paragraph 0011) two sets of battery packs, each battery pack provided with a cooling fan. The passage resistance of the coolant at each battery pack is designed such that the flow of coolant in each battery pack is substantially equal. However, the publication is silent about the problem of the in-car environment being degraded due to the airflow subsequent to cooling.

Japanese Patent Laying-Open No. 2004-268779 discloses a battery pack arranged below and traversing the front seat. However, there is a possibility that the battery pack output may be adversely affected since the region below the front seat is readily influenced by the heat from the exhaust pipe located under the floor of the vehicle.

Japanese Patent Laying-Open No. 2002-219949 discloses a cooling structure of drawing in cooling air from below the battery pack to conduct a cooling airflow upwards. This publication teaches that the battery pack is loaded at the trunk at the rear of the vehicle, and is absolutely silent about the approach of loading the battery pack in the passenger compartment.

Japanese Patent Laying-Open Nos. 2004-268779 and 2004-255892 disclose an inverter arranged in the center console box. It is difficult to ensure space to pass the harness through for the electrical connection between the battery pack located under the front seat and the inverter. There is a possibility of degradation in the workability of assembling respective apparatuses.

DISCLOSURE OF THE INVENTION

The problem to be solved by the invention corresponds to, in the case where the battery pack is arranged in the center console box located between the driver seat and the front passenger seat, degradation in the workability of assembling the battery pack and peripheral equipment. Therefore, an object of the present invention is to provide a battery pack loading structure including a favorable structure of workability in assembling a battery pack and peripheral equipment even in the case where the battery pack is arranged in the center console box.

A battery pack loading structure of the present invention includes a battery pack stored in a console box located between a driver seat and the front passenger seat, a junction box arranged on the battery pack in the console box, and an apparatus arranged below the driver seat or front passenger seat and electrically connected to the junction box by a harness.

In accordance with the battery pack loading structure of the present invention, the battery pack used in a vehicle can be arranged effectively in the space of the vehicle cabin. Furthermore, since the distance between the battery pack stored in the console box and the apparatus arranged beneath the front seat is short, the length of the harness employed for electrical connection between the battery pack and junction box can be shortened to render favorable the workability of assembling the battery pack and peripheral equipment.

BEST MODES FOR CARRYING OUT THE INVENTION

Figure 1:
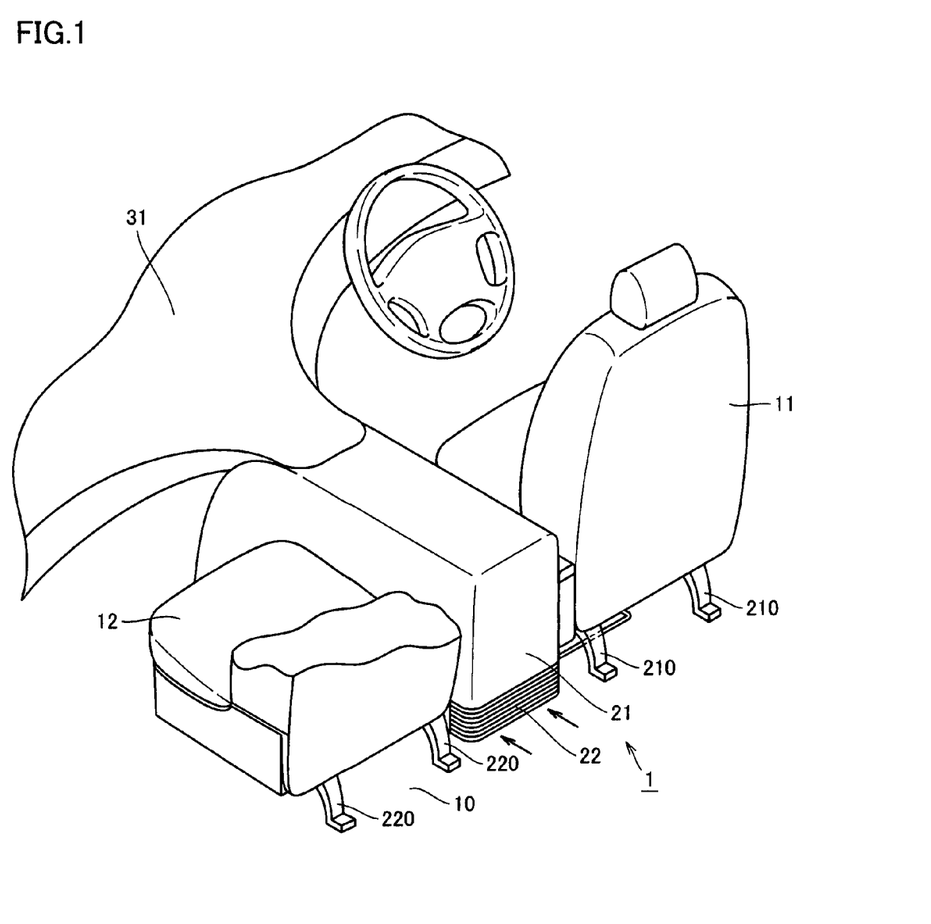
FIG. 1 is a partial perspective view of an appearance in a passenger compartment of a vehicle, according to an embodiment of the present invention.

An embodiment of a battery pack loaded in a vehicle according to the present invention will be described hereinafter with reference to the drawings. In respective drawings, the fore side, the aft side, the driver seat side, and the front passenger seat side of the vehicle are represented as the "front side", "rear side", "D side" and "P side", respectively. First, the schematic structure in the passenger compartment of the vehicle will be described with reference to FIGS. 1 and 2. FIG. 1 is a partial perspective view of an appearance in the passenger compartment of a vehicle, and FIG. 2 is a partial perspective view in the passenger compartment of the vehicle with the front seat and center console box removed.

(Passenger Compartment of Vehicle)

Referring to FIG. 1, a passenger compartment 1 of a vehicle includes, at the front region of the vehicle, a dash board 31 in addition to a driver seat 11 and a front passenger seat 12 arranged as the front seat. Driver seat 11 and front passenger seat 12 are affixed to the floor 10 of the vehicle by means of seat legs 210 and 220. In general, these seat legs 210 and 220 are concealed by a foot cover not shown. A center console box 21 extending in the longitudinal direction of the vehicle is arranged between driver seat 11 and front passenger seat 12. The lower end region of center console box 21 at the rear side has an air introduction slit 22 to draw in air from the passenger compartment into center console box 21 as the air for cooling.

Figure 2:
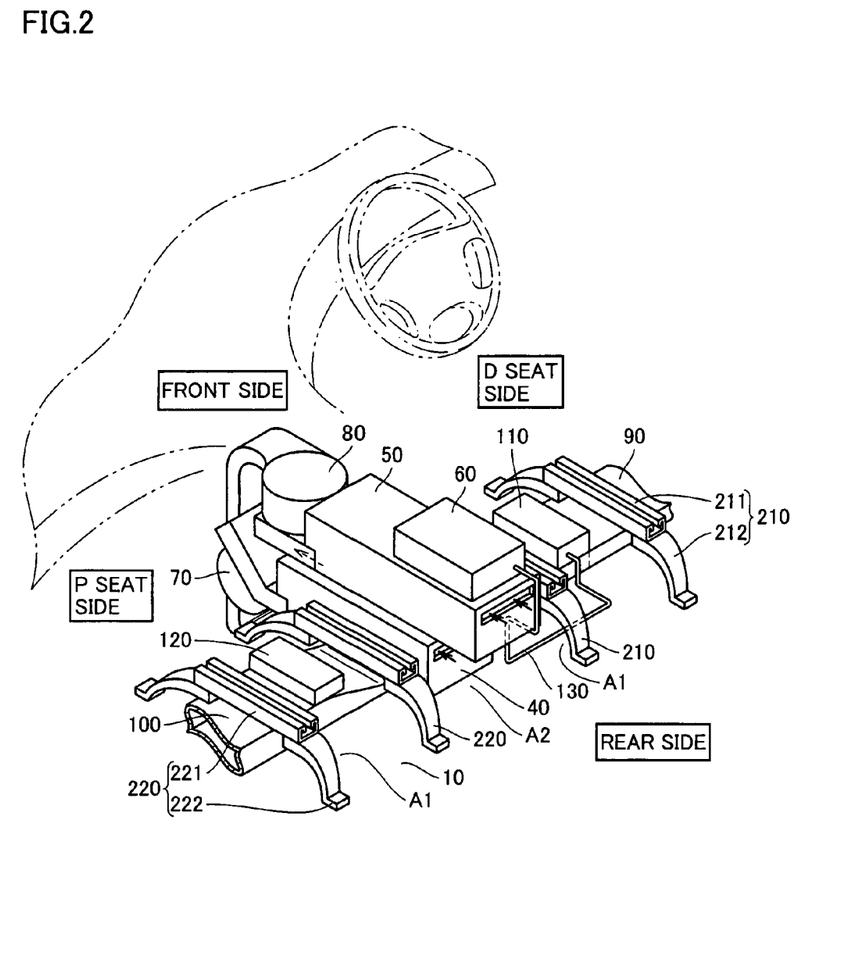
FIG. 2 is a partial perspective view in a passenger compartment of a vehicle with the front seat and center console box removed, according to an embodiment of the present invention.

Referring to FIG. 2, in center console box 21 are provided the battery pack including a first battery pack 40 and a second battery pack 50 disposed above first battery pack 40. A junction box 60 is placed above second battery pack 50.

A first cooling fan 70 is attached at the front side of first battery pack 40. First cooling fan 70 is connected to a first exhaust duct 90 extending towards the driver seat side. A second cooling fan 80 is attached at the front side of second battery pack 50. Second cooling fan 80 is connected to a second exhaust duct 100 extending towards the front passenger seat.

Driver seat 11 is mounted on seat legs 210, 210 of substantially a salient and upward configuration, extending in the longitudinal direction of the vehicle. Driver seat 11 is supported to move in the fore-and-aft direction. One pair of seat legs 210 is provided, arranged with a predetermined distance therebetween in the lateral direction. Each seat leg 210 is formed of one guide rail 211 and two semicircular arc-shaped legs 212. Similar to driver seat 11, front passenger seat 12 is mounted on seat legs 220, 220 of substantially a salient and upward configuration, extending in the longitudinal direction of the vehicle. Front passenger seat 12 is supported to move in the fore-and-aft direction. Likewise seat leg 210, seat leg 220 is formed of one guide rail 221 and two semicircular arc-shaped legs 222.

The aforementioned first exhaust duct 90 is disposed so as to traverse a space A1 defined by seat leg 210 and floor 10. Second exhaust duct 100 is disposed so as to traverse space A1 defined by seat leg 220 and floor 10. A DCDC converter 110 qualified as the target apparatus to be cooled is mounted on first exhaust duct 90 located at the driver seat 11 side. Audio equipment 120 is mounted on second exhaust duct 100 located at the front passenger seat 12 side.

(Detailed Structure of Cooling Apparatus)

Figure 3:
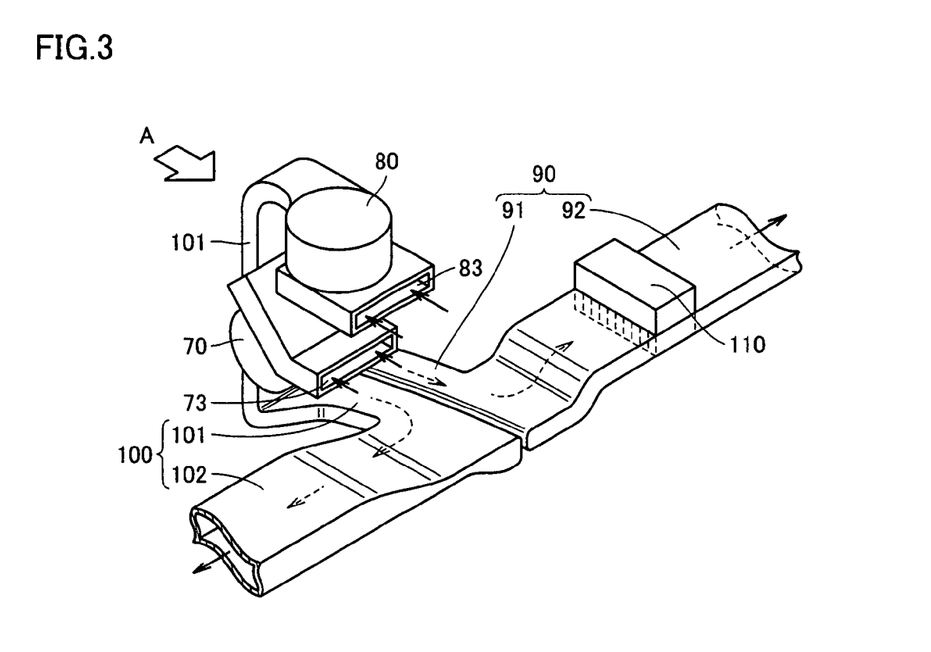
FIG. 3 is a perspective view of extraction of battery packs, sirocco fans, and exhaust ducts, according to an embodiment of the present invention.
Figure 4:
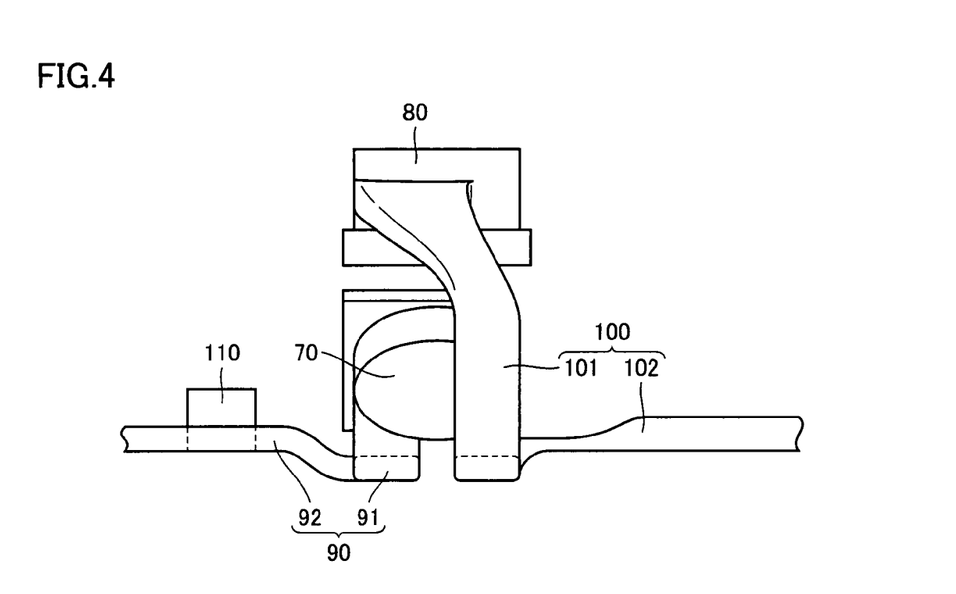
FIG. 4 is a view taken from the direction of arrow A in FIG. 3.
Figure 6:
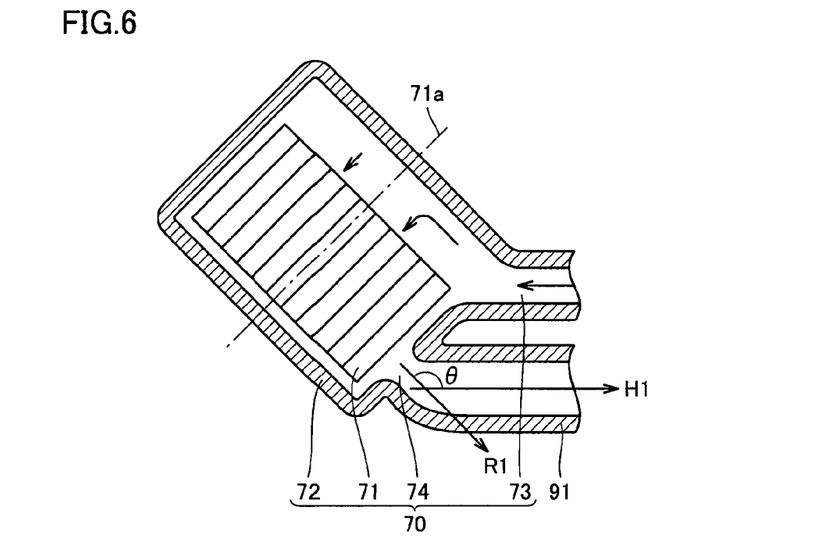
FIG. 6 is a partial enlarged sectional view of a first cooling fan attachment structure, according to an embodiment of the present invention.

In the structure set forth above, first cooling fan 70 and first exhaust duct 90 constitute the cooling apparatus for first battery pack 40. Second cooling fan 80 and second exhaust duct 100 constitute the cooling apparatus for second battery pack 50. A detailed structure of these cooling apparatuses will be described with reference to FIGS. 3-7. FIG. 3 is a perspective view of extraction of battery packs, sirocco fans, and exhaust ducts. FIG. 4 is a view taken from the direction of arrow A in FIG. 3. FIG. 5 is a vertical sectional view of inside the center console box taken along the longitudinal direction of the vehicle. FIG. 6 is a partial enlarged sectional view of the attachment structure of first cooling fan 70.

As shown in FIGS. 3-5, an air inlet 73 for first cooling fan 70 is connected to an air outlet 44 provided at the lower end side of first battery pack 40 at the front side of the vehicle. First exhaust duct 90 is connected to an air outlet 74 for first cooling fan 70. First exhaust duct 90 includes a first center exhaust duct 91 extending between driver seat 11 and front passenger seat 12 towards the rear side of the vehicle, and a first under seat exhaust duct 92 extending beneath driver seat 11 from first center exhaust duct 91. The exhaust outlet of first under seat exhaust duct 92 is connected to an exhaust duct arranged below driver seat 11 or below the door at the driver seat 11 side.

An air inlet 83 for second cooling fan 80 is connected to an air outlet 54 provided at the lower end side of second battery pack 50 at the front side of the vehicle. Second exhaust duct 100 is connected to an air outlet 84 for second cooling fan 80. Second exhaust duct 100 includes a second center exhaust duct 100 extending downwards towards floor 10 and then towards the rear side between driver seat 11 and front passenger seat 12, and a second under seat exhaust duct 102 extending beneath front passenger seat 12 from second center exhaust duct 101. The exhaust outlet of second under seat exhaust duct 102 is connected to the exhaust duct arranged below front passenger seat 12, or below the door at the front passenger seat 12 side. Thus, the exhaust ducts from the battery packs are respectively disposed beneath driver seat 11 and beneath front passenger seat 12. Accordingly, the discharged cooling air output from first and second battery packs 40 and 50 can be split into two directions to be output into the passenger compartment. As a result, the airflow around the foot output from first and second under seat exhaust ducts 92 and 102 can be reduced to avoid discomfort caused by increase in local airflow and prevent degradation of the cabin environment.

(Attachment Structure of Fan)

A sirocco fan 71 accommodated in a chamber 72 is employed for first cooling fan 70. A sirocco fan 81 accommodated in a chamber 82 is employed for second cooling fan 80. First cooling fan 70 and second cooling fan 80 have the same performance. First cooling fan 70 is an air blower that draws in air from the center region of sirocco fan 71 along a direction in which a rotation shaft 71a extends, and discharges air in a direction crossing rotation shaft 71a. Second cooling fan 80 is an air blower that draws in air from the center region of sirocco fan 81 along a direction in which a rotation shaft 81a extends, and discharges air in a direction crossing rotation shaft 81a.

If first cooling fan 70 provided for first battery pack 40 located at the lower side is attached in a manner similar to that of second cooling fan 80 located at the upper side, the exhaust duct must be bent extremely in a U shape so as to run towards the rear since there is no distance margin in height. However, bending the exhaust duct in a U shape is not preferable in view of resistance in air flow, i.e. pressure loss. Under these circumstances, air inlet 73 for first cooling fan 70 located at the lower side is disposed at the upper side, and air outlet 74 is disposed at the lower side in the present embodiment. Further, first cooling fan 70 is arranged such that a direction R1 of the exhaust flow output from first cooling fan 70 crosses an extending direction H1 of first center exhaust duct 91 at an angle θ larger than 90 degrees, as shown in FIG. 6.

Accordingly, input and output of air with respect to first cooling fan 70 can be realized without resistance in the air flow. It is to be noted that second center exhaust duct 101 is free of an extreme bent since the distance in the direction of height can be ensured as a result of second cooling fan 80 arranged above first cooling fan 70. Further, since the distance can be ensured in the direction of the height for second center exhaust duct 101, the duct channel can be shifted towards the front passenger seat side, as shown in FIG. 4.

As a result, first center exhaust duct 91 extends straight to the rear side from air outlet 74 of first cooling fan 70, and is disposed between driver seat 11 and front passenger seat 12 at the driver seat side. Second center exhaust duct 101 is arranged to descend towards floor 10 while gradually deviating towards the front passenger seat side from air outlet 84 of second cooling fan 80, and to run between driver seat 11 and front passenger seat 12 at the front passenger seat side.

(Heat Insulation Structure)

As a result of the arrangement of first center exhaust duct 91 and second center exhaust duct 101 on floor 10 between driver seat 11 and front passenger seat 12 as set forth above, respective exhaust ducts 91 and 101 are located between the bottom face of first battery pack 70 and vehicle floor 10. Each of exhaust ducts 91 and 101 constitutes a heat insulation layer by virtue of the flow of cooling air therein, allowing the heat transfer from an exhaust pipe 2 (refer to FIG. 7) disposed beneath floor 10 to first battery pack 70 to be blocked. Therefore, power supply of first battery pack 70 can be stabilized.

(Battery Pack Center Position Deviation)

Figure 7:
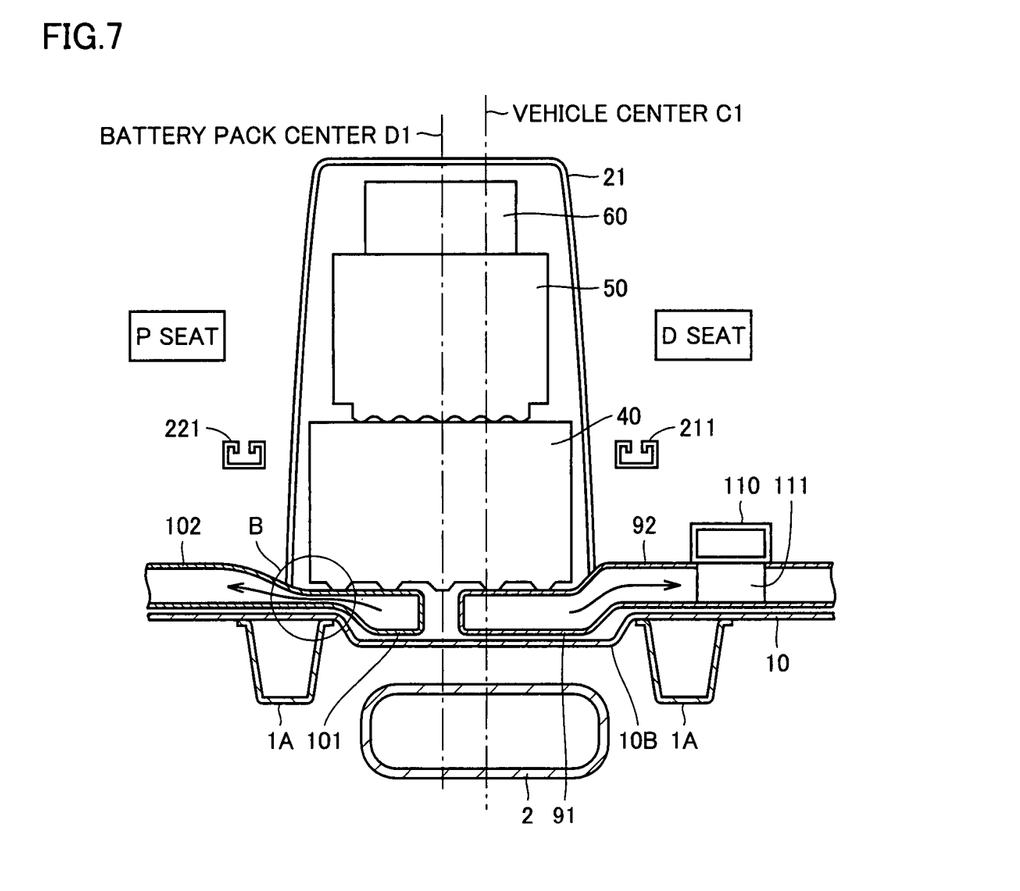
FIG. 7 is a vertical sectional view of inside the center console box taken along the transverse direction of the vehicle, according to an embodiment of the present invention.
Figure 8:
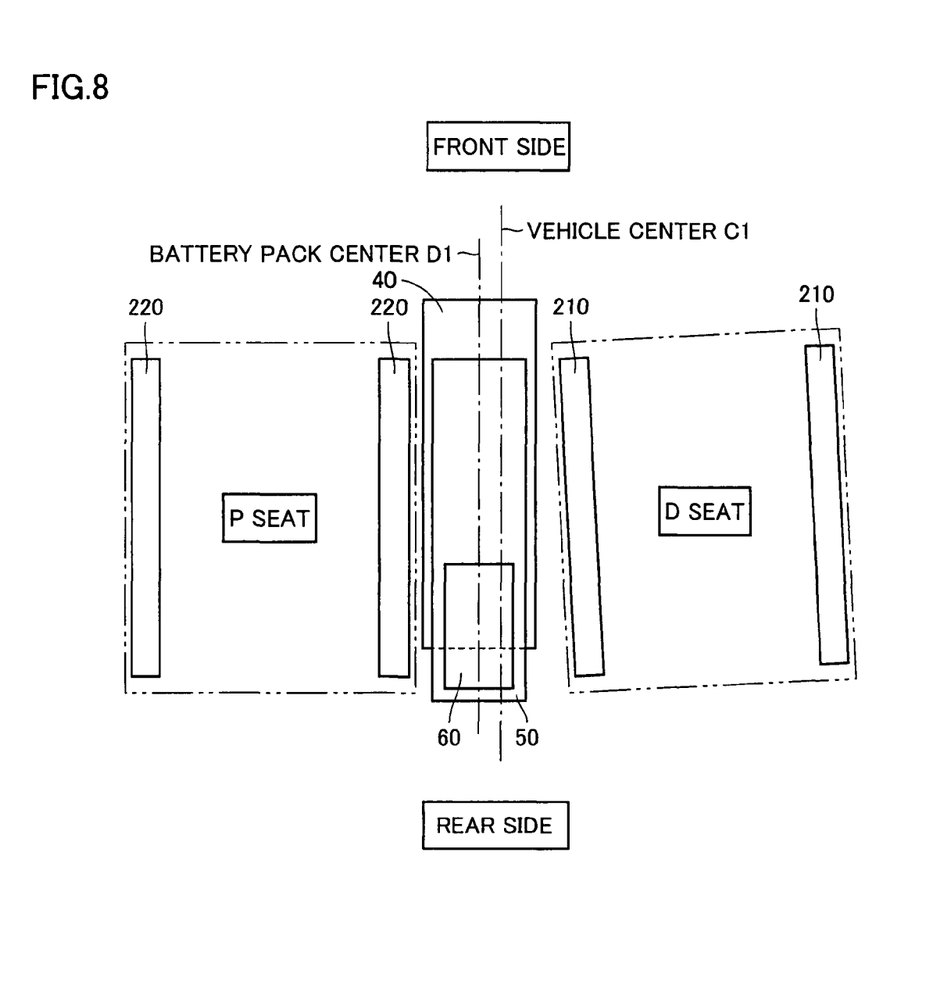
FIG. 8 is a plan view schematically showing the positional relationship of the vehicle center position, the battery pack center position, and the driver seat.

Deviation in the center position of the battery pack will be described hereinafter with reference to FIGS. 7 and 8. FIG. 7 is a vertical sectional view of the center console box taken along the transverse direction of the vehicle. FIG. 8 is a plan view schematically showing the positional relationship of the vehicle center position, the battery pack, and the driver seat.

As shown in FIG. 8, the driver seat is arranged directed to the inner side of the vehicle (approximately 1.5 degrees) for ensuring visual confirmation. Therefore, the position of the center D1 of the battery pack is located deviated to the front passenger seat side from the center C1 of the vehicle in order to ensure the space for moving driver seat 11 fore-and-aft. As shown in the sectional view of FIG. 7, floor 10B between auxiliary beams 1A has a recess downwards from the standpoint of mounting first and second battery packs 40 and 50 on floor 10 between driver seat 11 and front passenger seat 12, and arranging first and second center exhaust ducts 91 and 101 between floor 10 and first battery pack 40. As a result, auxiliary beam 1A cannot be changed in position since it is a reinforcing member. There will be a narrow region (the region enclosed by B in FIG. 7) between second center exhaust duct 101 and second under seat exhaust duct 102 at the region between the bottom of first battery pack 40 placed deviating to the front passenger side and floor 10, causing pressure loss in the flow of the cooling air at this region.

In view of the foregoing, DCDC converter 110 is placed at the first exhaust duct 90 side, extending in a direction opposite to the deviating direction of first and second battery packs 40 and 50 in the present embodiment. The first exhaust duct 90 side is advantageous in ensuring a large cross section of the passage, as will be described hereinafter. As shown in FIGS. 1, 3 and 7, DCDC converter 10 qualified as the target apparatus to be cooled is mounted on first under seat exhaust duct 92 at the first exhaust duct 90 side, and a cooling fan 111 provided for DCDC converter 110 is arranged so as to protrude into the conduit of first under seat exhaust duct 92. Thus, DCDC converter 10 can be cooled efficiently at first under seat exhaust duct 92 that allows sufficient passage of the cooling air. Further, the length of the exhaust duct can be set shorter than second exhaust duct 100 by virtue of arranging first battery pack 40 at the lower side. Accordingly, pressure loss is obviated to allow sufficient flow of cooling air.

In view of the foregoing, differentiating the capacity and/or operation condition of first cooling fan 70 and second cooling fan 80 connected to first exhaust duct 90 and second exhaust duct 100, respectively, can be thought of as an approach to equalize the relative pressure loss at the exhaust ducts. However, using cooling fans of different capacity will render control complex, and differentiating the rotation between the cooling fan may cause the additional problem of noise. If is therefore desirable to operate the fans at low speed. To this end, a cooling fan of the same performance is used for first cooling fan 70 and second cooling fan 80 in the present embodiment.

(Flow of Cooling Air)

In the cooling structure for a secondary battery of the above-described configuration, negative pressure is generated in first battery pack 40 and second battery pack 50 by operating first cooling fan 70 and second cooling fan 80, as shown in FIG. 5. As a result, the air in the passenger compartment is introduced into center console box 21 as the cooling air from air introduction slit 22 provided at the trailing end of center console box 21.

Then, air is taken into chamber 42 through air inlet 43 provided at the upper trailing end of first battery pack 40 to cool first battery assembly 41 and delivered from air outlet 44 to first cooling fan 70. Similarly, cooling air is taken into chamber 52 through air inlet 53 provided at the upper trailing end of second battery pack 50 to cool second battery assembly 51, and delivered from air outlet 54 to second cooling fan 80. Although a down flow-type cooling configuration is illustrated for first and second battery packs 40 and 50, any other cooling structure may be employed such as an upper flow type cooling configuration, as long as the air flow is delivered in the battery pack from the rear side to the front side of the vehicle.

Then, the cooling air is delivered to first exhaust duct 90 and second exhaust duct 100 by first cooling fan 70 and second cooling fan 80, respectively, to exhibit the heat insulation effect for first battery pack 70, as set forth below. The air also cools DCDC converter 110 mounted on first under seat exhaust duct 92. The cooling air can be output from first under seat exhaust duct 92 and second under seat exhaust duct 100, split into two directions, into the passenger compartment. As a result, the airflow around the foot output from first and second under seat exhaust ducts 92 and 102 can be reduced to avoid discomfort caused by increase in local airflow and prevent degradation of the cabin environment, as set forth below.

(Connection Between Junction Box and DCDC Converter)

The wiring of a harness 130 employed for the electrical connection between junction box 60 and DCDC converter 110 in the battery pack loading structure of the present embodiment will be described hereinafter with reference to FIG. 2. As described before, the battery pack of the present embodiment includes first battery pack 40 and second battery pack 50 disposed above first battery pack 40, and first battery pack 40 and second battery pack 50 are arranged such that the rear end of first battery pack 40 is located at the front side than the rear end of second battery pack 50. Accordingly, a space A2 is provided between the bottom of second battery pack 50 at the rear side and floor 10.

Additionally, junction box 60 is arranged on second battery pack 50. This junction box 60 is electrically connected to DCDC converter 110 placed on first under seat exhaust duct 92 by harness 130. With regards to the wiring arrangement of harness 130, one end of harness 130 is led out from the trailing end side of junction box 60 and descends along the rear side of second battery pack 50 to be routed to space A2 formed between the bottom of second battery pack 50 at the rear side and floor 10. Then, harness 130 runs traversing space A1 defined by seat leg 210 and floor 10. Eventually, the other end of harness 130 is connected to DCDC converter 110.

DCDC converter 110 is an example of an apparatus electrically connected to junction box 60 by harness 130. A wiring arrangement similar to that of harness 130 set forth above can be employed for an apparatus placed under driver seat 11 or front passenger seat 12.

In accordance with the wiring of harness 130 in the battery pack loading structure, first and second battery packs 40 and 50 employed in a vehicle can be arranged efficiently in the space of the passenger compartment, and the distance between second battery pack 50 accommodated in center console box 21 and DCDC converter 110 arranged under driver seat 11 (or front passenger seat 12) can be shortened. Therefore, the length of the harness employed for electrical connection between second battery pack 50 and DCDC converter 110 can be reduced, and the workability in assembling the battery pack and peripheral apparatus can be rendered favorable.

Although harness 130 must be routed vertically, harness 130 cannot be led directly breadthwise of the vehicle since seat rail 211 of seat leg 210 is located in the neighborhood of center console box 21. Further, the approach of routing harness 130 at the front side of second battery pack 50 is not preferable in view of harness 130 being damaged in the case of front-end collision. The arrangement of harness 130 in the present embodiment is advantageous in that harness 130 will not be damaged at the time of front-end collision since the arrangement of routing harness 130 downwards along the rear side of second battery pack 50 is employed. Further, the workability of assembling is facilitated by virtue of routing harness 130 to space A2.

Although a battery pack of a structure having two stages of battery packs arranged vertically is employed in the embodiment set forth above, a similar functional advantage can be achieved by a battery pack having a configuration of one stage or a plurality of stages.

It should be understood that the embodiments disclosed herein are illustrative and non-restrictive in every respect. The technical range of the present invention is defined by the appended claims, and all changes that fall within limits and bounds of the claims, or equivalent thereof are intended to be embraced by the claims.

The invention claimed is:

1. A battery pack loading structure comprising:
    a battery pack stored in a console box arranged between a driver seat and a front passenger seat,
    a junction box arranged on said battery pack in said console box,
    an apparatus arranged below said driver seat or said front passenger seat, and electrically connected to said junction box by a harness,
    said driver seat and said front passenger seat are mounted on a seat leg of substantially a salient and upward configuration, extending in a longitudinal direction of a vehicle, and
    said harness descends along a rear side of said battery pack to traverse a space defined by said seat leg and a floor, and is electrically connected to said apparatus.

2. The battery pack loading structure according to claim 1, wherein
    said battery pack comprises a first battery pack including a first battery assembly, and a second battery pack disposed above the first battery pack, and including a second battery assembly,
    a rear end of said first battery pack is located in advance of the rear end of said second battery pack to define a space between a rear side bottom of said second battery pack and the floor, and
    said harness descends along a rear side of said battery pack to pass said space, and traverse the space defined by said seat leg and the floor.

* * * * *